United States Patent [19]

Das

[11] Patent Number: 4,866,585
[45] Date of Patent: Sep. 12, 1989

[54] AC TO DC SOLID STATE POWER SUPPLY USING HIGH FREQUENCY PULSED POWER SWITCHING

[76] Inventor: Pawan K. Das, 101 Kent Ave., Marlton, N.J. 08053

[21] Appl. No.: 203,915

[22] Filed: Jun. 8, 1988

[51] Int. Cl.$^4$ .......................................... H02M 7/219
[52] U.S. Cl. ........................................ 363/8; 363/47; 363/80; 363/89; 363/127
[58] Field of Search ................. 363/8, 44, 45, 47, 48, 363/84, 88, 89, 129, 80, 81, 127; 323/282, 285

[56] References Cited

U.S. PATENT DOCUMENTS

| | | | |
|---|---|---|---|
| 3,226,630 | 12/1965 | Lampke | 323/282 |
| 3,241,044 | 3/1966 | Mills | 323/282 |
| 3,535,611 | 10/1970 | Toulemonde | 363/8 |
| 4,321,662 | 3/1982 | Yokoyama | 363/89 |
| 4,412,277 | 10/1983 | Mitchell | 363/89 |
| 4,523,266 | 6/1985 | Nelson | 363/48 |
| 4,535,203 | 8/1985 | Jenkins et al. | 363/127 |
| 4,646,219 | 2/1987 | Rohl | 363/21 |

FOREIGN PATENT DOCUMENTS

| | | | |
|---|---|---|---|
| 2226546 | 1/1973 | Fed. Rep. of Germany | 363/48 |
| 2322465 | 11/1974 | Fed. Rep. of Germany | 363/88 |
| 189173 | 8/1986 | Japan | |
| 875564 | 8/1961 | United Kingdom | 363/127 |

*Primary Examiner*—William H. Beha, Jr.
*Attorney, Agent, or Firm*—Charles F. Duffield

[57] ABSTRACT

A highly innovative new technique of developing AC to DC power sources for various applications has been described. Such technique of generating DC power is different from the conventional linear and switching power conversion techniques and this new technology has been called the Solid State Power Supply (SSPS) Technology. The principle of operation depends upon high-frequency pulsed power switching followed by high energy charge-discharge principles as applied to power conversion technology. The use of fast turn-on power MOSFETs enables the application of high frequency switching on this power technology. While the non-isolated SSPS is claimed to be transformerless, the isolated SSPS requires the use of a transformer for input-output isolation. The input and output filtering is reduced tremendously, thereby reducing the size of such power supplies. The SSPS technology is expected to revolutionize the 50/60/400 Hz power conversion technology and a compactness as much as 4:1 over the current 50KHz switching power supply is possible.

10 Claims, 7 Drawing Sheets

AC TO DC SOLID STATE POWER SUPPLY USING HIGH FREQUENCY PULSED POWER SWITCHING

CROSS-REFERENCE TO RELATED DISCLOSURE DOCUMENT FILED EARLIER AND OTHER PATENT APPLICATION FILED WITH THIS APPLICATION

1. "Solid State AC/DC, DC/DC & DC/AC Power Supplies", Disclosure Document No. 151851, filed June 12, 1986 by Pawan K. Das and stamped June 16, 1986 by the U.S. Patent Office,
2. "DC to DC Solid State Power Supply", U.S. application Ser. No. 203,916, filed June 8, 1988 by Pawan K. Das.
3. "DC to AC Solid State Power Supply", U.S. application Ser. No. 203,917, June 8, 1988 by Pawan K. Das.

While the disclosure document, item 1, relates to AC to DC, DC to DC and DC to AC power supplies, three patent applications filed separately, as stated above in items 2 and 3 and this very application, contain information that were included in the said disclosure document. Additional details, as developed later, are included as well.

BACKGROUND OF THE INVENTION

Power supply technology has been in existence since the beginning of the electronic world. All electronic circuits must be powered from a reliable DC source and such power source must be generated from an everlasting source of AC power. Currently there exist two technologies of generating DC power from the AC line voltage: Linear Power Supply Technology and Switching Power Supply Technology. The linear power supply requires a transformer to step-down or step-up the AC voltage at the input frequency of 50/60/400 Hz. The rectifier circuit rectifies the AC voltage to desired pulsating DC voltage and the output filter, together with the voltage regulator circuit, regulates the intermediate voltage to the desired DC voltage. The operation at low input frequency requires a large size of transformer. The switching power supply is smaller in size on account of using a switching frequency of 50 KHz to 200 KHz and this reduces the size of the transformer and the filtering circuits. Both technologies use transformers and capacitors inherently and on account of the odd shapes of such components, certain compact packaging is not possible. It is difficult to make small cubic modules of power supplies of small to medium power ratings. It is impossible to make a power supply in the form of powercard of under one inch in width, which can be plugged with other compatible CPU, memory, controller and other printed circuit cards, all spaced one inch or so, in a card-cage unit. It is difficult to make small hybrid power modules with AC input and DC output, which can be installed directly on a printed circuit card or outside and deliver upto 100 watts of power. It is highly desirable that the power supply technology be revolutionized further and the new technology developed should ensure the birth of these products. The Solid State Power Supply (SSPS) Technology, as described herein, shall reduce the size of the odd-shaped components, thereby making power supplies of various compact shapes and sizes that were not possible before.

SUMMARY OF THE INVENTION

Several new innovations in semiconductor microminiaturization and related program have reduced the size of electronic and electromechanical products to very compact size, whereas the size of the power sources that energize such products, has stayed the same. This requires the development of new power sources and power distribution networks of various catagories. such power products, once reduced to a compact size, shall find a wide application in several electronic and electromechanical products.

The primary elements of a AC/DC switching power supply are: (a) auxiliary power supply, (b) input rectifier/filter, (c) input switching circuit, (d) isolating transformer, (e) control circuit, (f) magnetic circuit, (g) output rectifier/filter, (h) heat distribution element, and (i) packaging. Most swithing power supplies operate at a swithching frequency of 50 KHz to 200 KHz. In that range, the size of the transformer and filter reduces considerably. The use of high power MOSFETs, in place of power transistors, has although made such power supplies smaller, there exist some additional means, the importance of which has not been realized. Here are some of the methods which must be given a due consideration:

(a) Employ very high frequency switching, as high as 1 MHz, due to added advantage of reducing the size of the magnetic and filtering circuits.
(b) Devise means of reducing filtering at the input and output levels without losing regulation.
(c) Develop circuits that eliminate totally the use of transformer. Alternately, reduce further the size of the transformer/inductor by utilizing special type of ferrite material which exhibits a low loss at such a high frequency.
(d) Perform step-down function through high frequency RLC charge-discharge method.
(e) Employ charge-discharge output sense and control mechanism, which shall be compatible with the high frequency switching.
(f) Employ pulsed-power capability of MOSFETs in order to reduce further the size of the filtering circuits.
(g) Conduct advanced reseach to devise new series of high density semiconductor devices for this application.
(h) Utilize better quality of heat sink and heat transfer mechanism that will reduce the volume of the converter.

The SSPS approach, as applicable to AC to DC power supply technology, calls for using a RLC circuit across the output of a lightly filtered 60 Hz rectified pulsating voltage which shall be switched on and off at very high frequency by a fast acting comparator. As soon as the switching circuit is turned on, the voltage across the capacitor starts increasing exponentially due to the flow of high inrush current. As soon as the voltage reaches a value at which the capacitor has stored sufficient energy to provide power to the load, the switching circuit is turned off automatically. The capacitor now starts discharging to the load and the voltage diminishes exponentially. As soon as it drops to a predetermined value, the switching circuit turns on again, which repeats the cycle.

These methods will benefit most if the switching circuit be of maximum current carrying capacity, the charge time be small, the size of the capacitor be small enough to hold sufficient energy to discharge to a lower voltage level and the size of the inductor be sufficiently small to limit the current to an acceptable level as demanded by the switching circuit.

There is described herein, with reference to accompanying drawings a new method of AC to DC power conversion. This requires simultaneous switching and rectification of the AC voltage, a method which was never used before, and controlling the switching period by sensing the output voltage. This allows a reduced-period switching when the peak AC voltage is high and increased-period switching when the instantaneous voltage is low. A high frequency transformer between the input switching MOSFET(s) and the output filter makes this circuit an isolated SSPS, whereas, the absense of transformer makes this a non-isolated SSPS. The non-isolated SSPS may be useful for small electronic products where isolation from input power is not desirable and the isolated SSPS shall be useful in several applications with large systems and systems with multiple interfacing.

For medium and large power source a voltage rectification with full-wave rectified sine wave is desirable. This with simultaneous switching develops a h-f switched and full-wave rectified sine wave. With periodic switching and the period such as to generate narrow pulses during peak sine wave and wide pulses during low value sine wave, the voltage so generated can be filtered to generate the desired DC power. In this case the control circuit must detect the period of the positive and negative waves and after modulating this with the output level detector, generate positive and negative pulse control signals. These postive and negative pulse control signals are used to trigger the MOSFETs that control the positive and negative sinusoidal voltages.

For low and medium power source, half-wave rectification is sufficient. Here only one MOSFET is used to perform rectification and simultaneous high frequency switching. Here there is no voltage switching during negative period of the sinusoidal wave and thus considerably wider periodic h-f switching is required here. Also the absense of negative period switching increases the size of the output filter considerably. The half-wave rectified power supply may also be of isolated and non-isolated type. The non-isolated power source may be used in power plugs or small power supplies, whereas the isolated ones in several small to medium power sources that require multiple interfacing.

The SSPS power conversion requires pulsed-power switching. Here a high voltage switched pulse is requires to charge the output capacitor. Compared to normally switched and rectified voltage in the switching power supply, this method employs considerably larger voltage at the input side. This reduces the charge time of the capacitor by a greater extent and thus allows the use of higher frequency switching pulse. The fast turn-on switching reduces the size of the output capacitors, thus reducing the size of the power supply.

Power supplies developed through SSPS Technology shall have numerous advantages over currently available switching power supplies. Some advantages are greater power density, automatic operation at 115 V or 230 V AC, light filtering, inherent brownout protection, high MTBF and certain other advantages. The inventor has already breadboarded and tested an AC/DC SSPS using existing components and most of the benefits have been observed to be valid. It is good to note that the SSPS Technology offers a series of advantages over linear and switching power supply technology.

BRIEF DESCRIPTION OF THE DRAWINGS

The invention will become more readily apparent by studying the accompanying drawings, a brief description of which is given below.

FIG. 3 includes the major power components while FIG. 4 contains the major control circuit.

DESCRIPTION OF THE PREFERRED EMBODIMENT

Figure 1:
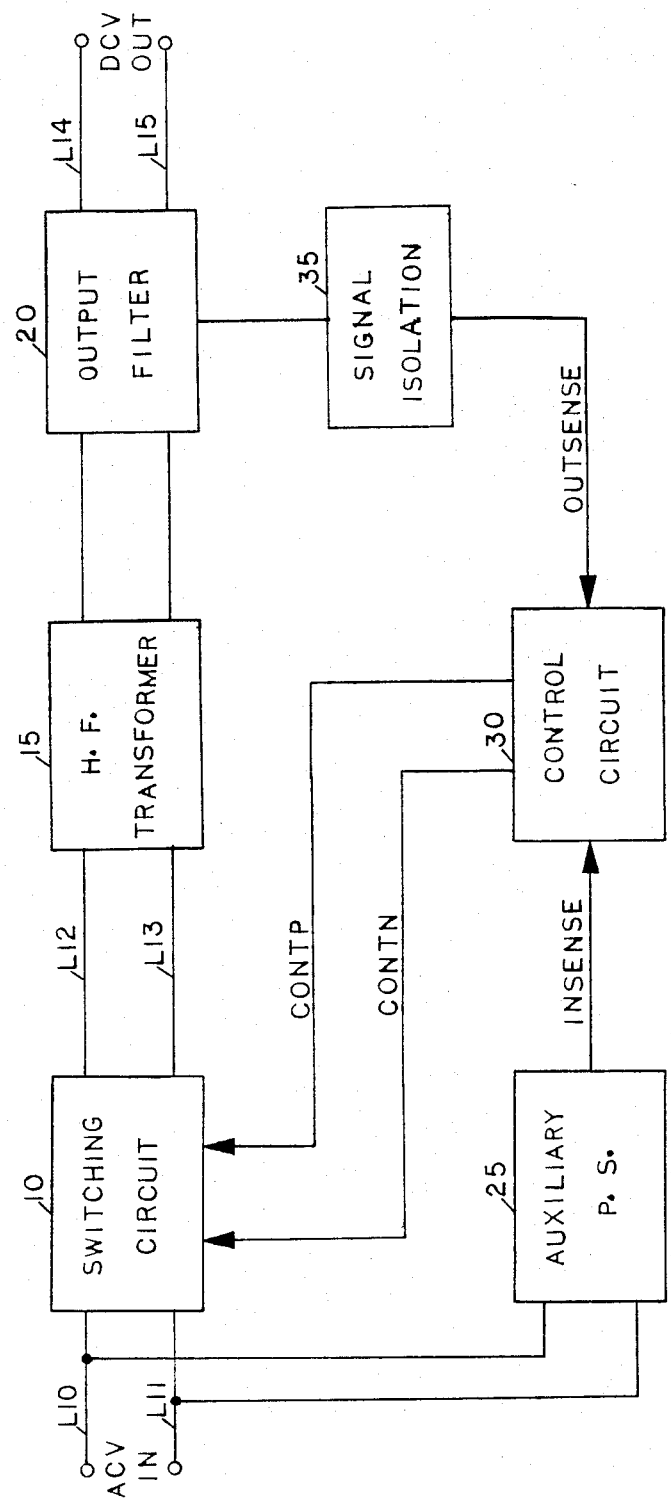
FIG. 1 is the basic block diagram of the isolated SSPS using full-wave rectification. This shows the interconnection of major components with the control circuit.

There is illustrated in FIG. 1 the block diagram of the isolated full-wave rectified solid state power supply. While FIG. 2 contains a block representation of the control circuit, FIGS. 3 and 4 contain the detailed schematic of the full-wave rectified isolated SSPS. Detailed timing diagrams of the control and power-level signals are included in FIGS. 5 and 6, and FIG. 7 contains the schematic of the half-wave rectified isolated SSPS. Power supplies of the full-wave versus half-wave and isolated versus non-isolated types are all described in detail in the next sub-sections.

The preferred embodiment contains detailed description of the following sub-sections:
1. General Description of the SSPS,
2. Detailed Description of the Full-Wave Rectified Isolated SSPS,
3. Description of the Half-Wave Rectified Isolated SSPS,
4. MOSFET as a Pulsed-Power Circuit, and
5. Description of the Non-Isolated SSPS.

All these sub-sections are catagorically described now.

General Description of the SSPS

Figure 2:
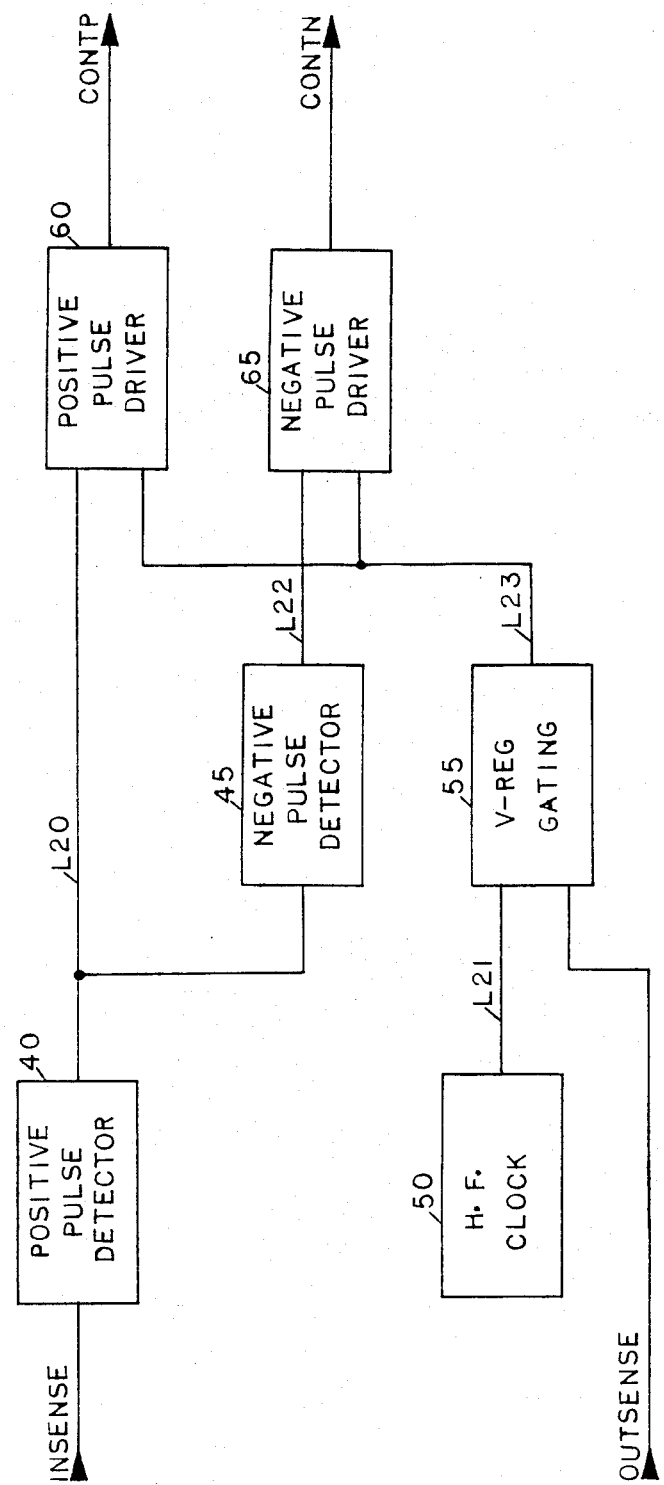
FIG. 2 is the block diagram of the control circuit for isolated full-wave rectified power supply. This shows the generation of positive and negative control signals from the input and output sensed signals.

This sub-section describes the block diagram of FIGS. 1 and 2. Referring to FIG. 1, the AC input voltage ACV IN is fed through lines L10 and L11 to the input of the switching circuit block 10 and the auxiliary power supply block 25. The output of the switching circuit block 10 is connected to the input of the high frequency transformer block 15 through lines L12 and L13. Similarly, the output of the h-f transformer block 15 is connected to the input of the output filter block 20. The output of this block is the DC voltage DCV OUT, which appear across lines L14 and L15.

The control circuit block is represented by block 30. This has two inputs and two output lines. The auxiliary power supply block 25 serves two purposes—it provides a usable DC voltage at low power level to drive the control circuit and it provides a signal in phase with the input AC voltage. This signal is called the input sense signal INSENSE and is one of the inputs to the control circuit block 30. The output of the power supply at L14 is brought out internally and after passing through the signal isolation block 35, it is renamed the output sense signal OUTSENSE. This is the second input to the control circuit block 30. Both these input signals together with an internally generated clock signal, generates outputs CONTP and CONTN. These output signals control the turning on and off of two MOSFETs which are in the positive and negative AC wave side of the switching circuit.

Details of the control circuit are shown in FIG. 2. Here input sense signal INSENSE passes through the positive pulse detector block 40 to generate the positive pulse signal on line L20. This signal, when fed to the negative pulse detector block 45, generates a negative pulse signal on line L22. Block 50 is a high frequency clock generating block and the h-f signal on line L21 is gated through the OUTSENSE signal in the V-REG GATING block 55. The output of this is a gated clock over line L23. This when gated with the positive and negative pulse signals over lines L20 and L22, generates positive control signal CONTP and negative control signal CONTN in the positive pulse driver block 60 and the negative pulse driver block 65 respectively. These two signals are fed from the control circuit block 30 to the switching circuit block 10 of FIG. 1.

The whole process is such that the output voltage, when isolated, generates signal OUTSENSE. If this is below certain reference level then switching circuit is turned on and off regularly at high frequency. But as soon as signal OUTSENSE exceeds the reference signal, the switching circuit(s) are turned off for a short duration as long as this condition persists. During this time, the output voltage, which exceeded slightly above the desired output voltage, drops down until signal OUTSENSE falls below the reference signal. The switching circuit continues turning on and off again at high frequency and the cycle repeats.

Detailed Description of the Full-Wave Rectified Isolated SSPS

Figure 3:
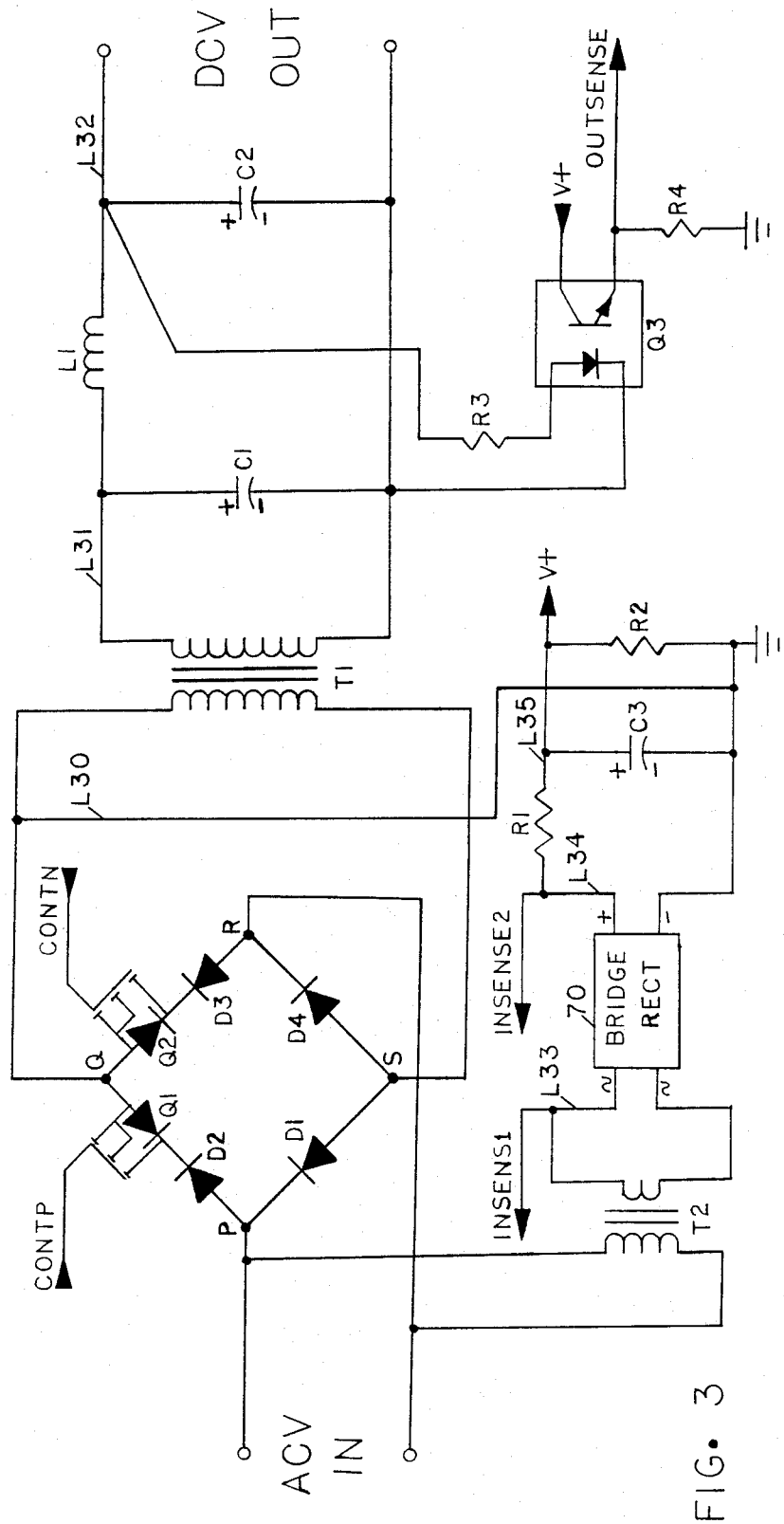
FIGS. 3 & 4 together are complete schematic of the full-wave rectified isolated solid state power supply.
Figure 4:
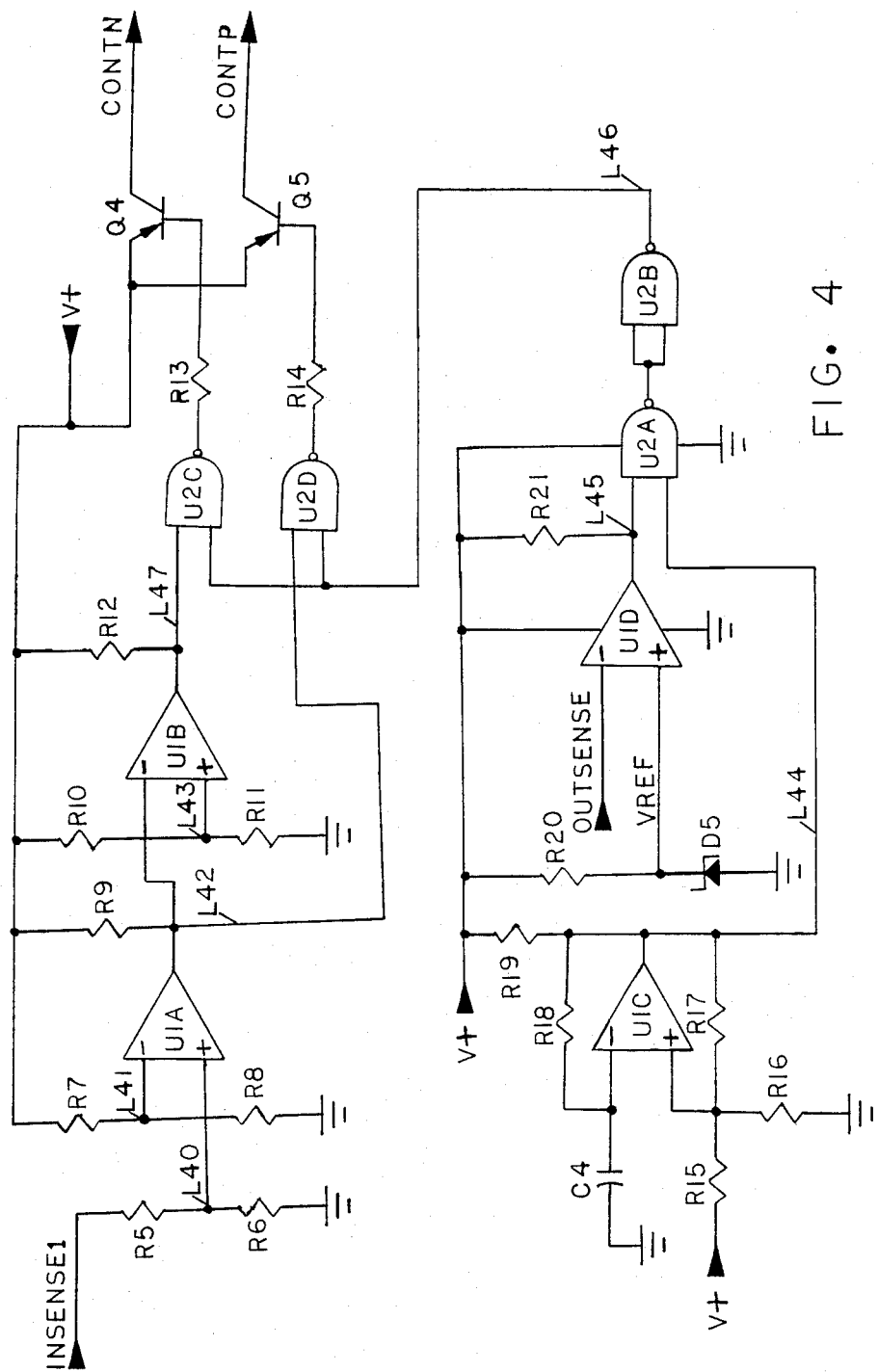

Block diagrams of FIGS. 1 & 2 have been detailed in FIGS. 3 & 4 in the form of schematics. Referring to FIG. 3, PQRS is a controlled bridge rectifier with limbs PQ and RQ controlled on and off by MOSFETs Q1 and Q2. Diodes D1 and D2 in these limbs keep the limbs reverse biased when voltage of the opposite polarity is applied across them. Diodes D4 and D3 across limbs SP and SR serve as the other diodes of this controlled bridge rectifier.

Transformer T1 is a high frequency isolation transformer. This isolates the input voltage with the output voltage. The output circuit with capacitors C1 and C2 and inductor L1 serve as the output filter circuit. The optoisolator Q3 with the input resister R3 and the output resister R4 serves as the feedback signal isolating circuit.

Transformer T2 is part of the auxiliary power supply. It steps down the AC voltage to a value useful for control circuit. The bridge rectifier 70, as connected to the output winding of the transformer T2 and the output filtering circuit, comprised of resistors R1 & R2 and capacitor C3 constitute other components of the auxiliary power supply. The negative side of the output of the auxiliary power supply and side Q of the controlled bridge rectifier PQRS are connected together. This is required for providing proper bias to the MOSFETs. The output voltage V+ of the auxiliary power supply should be in the range of 9 V to 15 V in order to provide sufficient gate-source drive to the MOSFETs.

The control circuit is detailed in FIG. 4. This is based upon a quad comparator IC, LM139, denoted by U1A through U1D and a quad NAND gate IC, CD4011, denoted by U2A through U2D. Other comparators and logic gates may be used as well, if they meet certain design requirements. Circuit formed by U1A and R5 through R9 is a positive pulse detector and the circuit formed by U1B and R10, R11 & R12 is a negative pulse detector. Also, circuit around U1C is a high frequency clock and the circuit around U1D is V-REG GATING circuit. Finally, circuit with U2C, R13 and Q4 form negative pulse driver circuit and the circuit with U2D, R14 and Q5 form positive pulse driver circuit.

Figure 5:
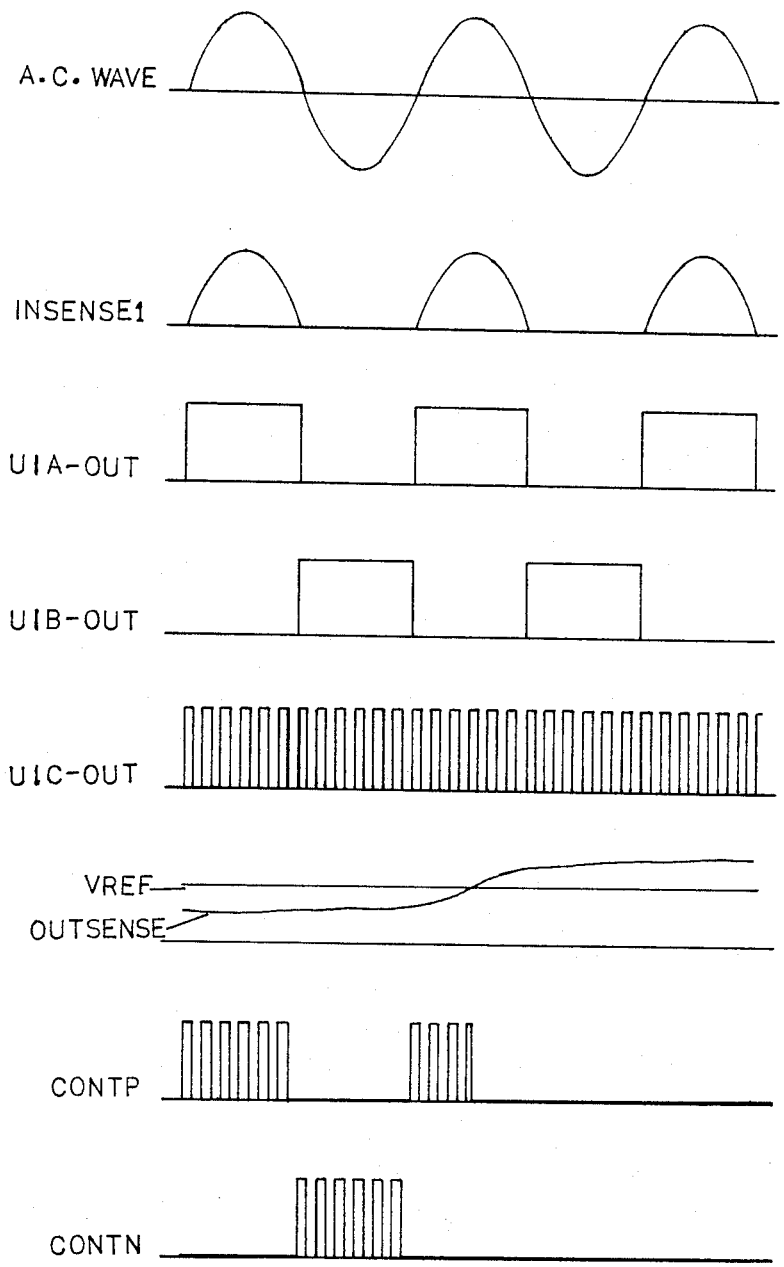
FIG. 5 is the timing diagram of the control signals of FIG. 4. All major signals, from the input signal to the output signal and related intermediate control signals are specified.

Referring to FIG. 3, the waveform of the AC sine wave, appearing across PR is shown by waveshapes A.C. WAVE of FIG. 5 and ACW of FIG. 6. Signal INSENSEI at L33 of FIG. 3 is a half-wave rectified sine wave and this is shown in FIG. 5. This signal, when divided through R5, R6 of FIG. 4 and fed to the positive input of the comparator U1A at L40, it produces a square wave signal at L42. For this, the negative input at L41 of the comparator U1A is set by resistors R7 & R8 at a potential slightly above ground potential. This square wave signal is shown by U1A-OUT in FIG. 5. Circuit U1B works like an inverter. For this, R10 & R11 set the potential at L43 to midpoint of V+ approximately. Output of U1B at line L47 is shown by wave U2B-OUT of FIG. 5. Circuit U1B may be replaced by a logical inverter gate, if required.

Comparator U1C with associated resistors R15 through R19 and capacitor C4 forms a standard clock generator. The clock output at L44 is shown by waveshape U1C-OUT of FIG. 5. This clock generator may be made of two or three NAND/NOR gates or logical inverters, or alternately, a clock generator driven by crystal may be used here.

The output of the SSPS at L32 of FIG. 3 is sensed by the optoisolator Q3. Here R3 and R4 are selected to provide signal OUTSENSE such that normally with the desired output voltage, this signal voltage is equal to the signal VREF, as selected by R20 and D5 in FIG. 4. When OUTSENSE is less than VREF, i.e., when DC voltage at L32, FIG. 3 is less than the desired DC output, high frequency clock at L44, FIG. 4 passes through gates U2A and U2B. The gated at L46 is further gated by the positive and negative pulse detectors at gates U2D and U2C respectively. Q4 and Q5, two transistors and resisters R13 and R14 are used to increase the drive capability of the negative and positive control signals CONTN and CONTP respectively. These signals are shown in FIG. 5. These are connected directly to the gates to MOSFETs Q2 & Q1. Thus when DC voltage is less than the desired output, signal OUTSENSE will be less than VREF. This puts L45 of FIG. 4 at high level and MOSFETs keep turn on and off at high frequency. As soon as the output exceeds the desired output level, signal OUTSENSE becomes greater than signal VREF and the MOSFETs get turned off.

It may be noted that signal INSENSE2 at L34 of FIG. 3, which is a full-wave rectified sine wave, can also be used to generate the control signals. This signal, when passed through the circuit comprised of U1A and R5 through R9, the output will have a narrow pulse at every zerocrossing point. This, when clocked through a D-Flip-Flop, will generate positive and negative pulse detector signals of L42 and L47, FIG. 4. The rest of the circuit may remain unchanged.

Figure 6:
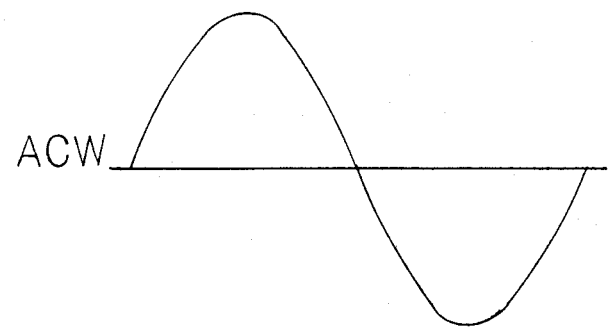
FIG. 6 is the timing diagram of the voltage at different points of FIG. 3. Here all major voltage waveforms, from AC input to DC output, are specified.
Figure 6:
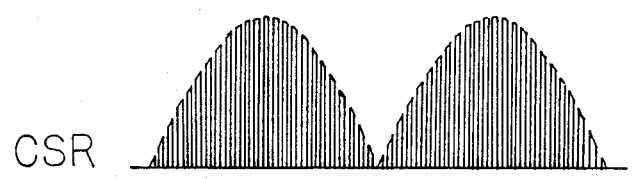
Figure 6:
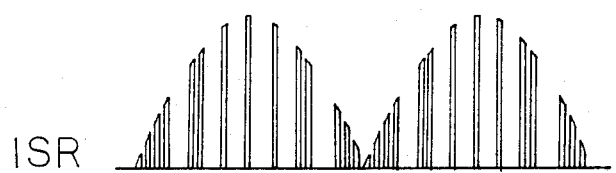
Figure 6:
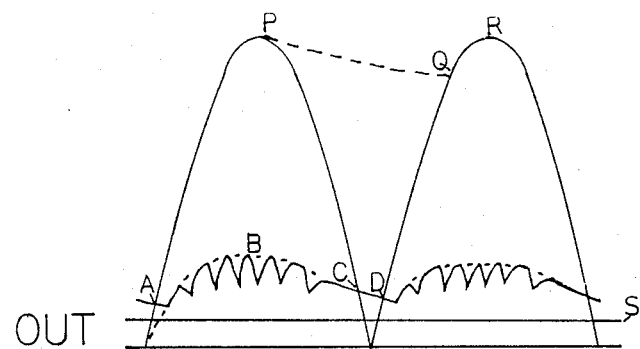

Referring to FIG. 6, signal CSR is a continuously switched and full-wave rectified sine wave. This signal is generated when MOSFET Q1 is triggered on and off at high frequency during positive wave of the sinusoidal input and MOSFET Q2 is turned on and off during negative wave of the sinusoidal input voltage. Signal ISR, FIG. 6, is intermittently switched and full-wave rectified signal. This is generated when the MOSFETs are triggered for larger duration during low values of the sinusoidal voltage and for short duration during large peak values of the sinusoidal voltage. This signal is generated when capacitors C1 and C2 are pretty small. Considerably larger capacitors filter out the peak values of the pulses and the voltage so generated are represented by curved ABCD of the plot OUT, FIG. 6. Also, the DC output is shown by signal S in FIG. 6.

It may be important to mention that a switching power supply normally requires a heavy filtering at the high voltage input side in order to limit the voltage ripple to a low value. Typically, the voltage waveform across the input capacitor of a switching power supply shall be as shown by waveform PQR of FIG. 6. Here the amount of ripple at point Q is much smaller than the peak value of the pulsating AC voltage. Typically, the ripple voltage at the input may be about 5 percent of the peak AC voltage. To achieve such a low ripple requires a heavy amount of filtering at the input level in the Switched-Mode Power Supply (SMPS).

The SSPS Technology does not require such a heavy filtering. All that is required here is that the smallest instantaneous voltage available at capacitor C1 be greater than the largest instantaneous voltage generated at capacitor C2. The overall envelope of the voltage waveform at the high voltage input capacitor C1 can thus be represented by the waveform ABCD. Here the instantaneous input voltage at point D in some cases be allowed to be under 20 percent of the peak AC input voltage. This large ripple-acceptance-criterion demands that the size of the high voltage input capacitor C1 may be even smaller than 20 percent of the size required for the switching power supply.

This can be better explained with an example. Consider a 25 watts power supply operating at 115 V 60 Hz AC at an efficiency of 75 percent. The current at the input circuit will be $$I=25/(0.75\times1.4\times115)+0.207A$$

Now for SMPS, considering a maximum ripple of 5 percent at the input side, we have $$\Delta V=0.05\times115\times1.4V=8.13V, \text{ and}$$

$$C1=I/(2\Delta Vf)=212\mu F$$

For isolated SSPS with 1:1 transformer, considering an output voltage of 9 V and the minimum instantaneous input voltage to be 100 percent higher than the output voltage, we get, $$\Delta V'=115\times1.4-2\times9=143V$$

Thus, $C1'=I/(4\Delta V'f)=5.9\mu F$

Nearest practical value of the input capacitors in these cases shall be 220μF and 6.8μF respectively. This makes a reduction factor of 32:1. The use of different coefficients of 2 and 4 in computation of the capacitance is because of the fact that in the SMPS the capacitor discharges in one-half the AC period and in the SSPS the capacitor discharges in one-fourth the AC period approximately.

Description of the Half-Wave Rectified Isolated SSPS

Figure 7:
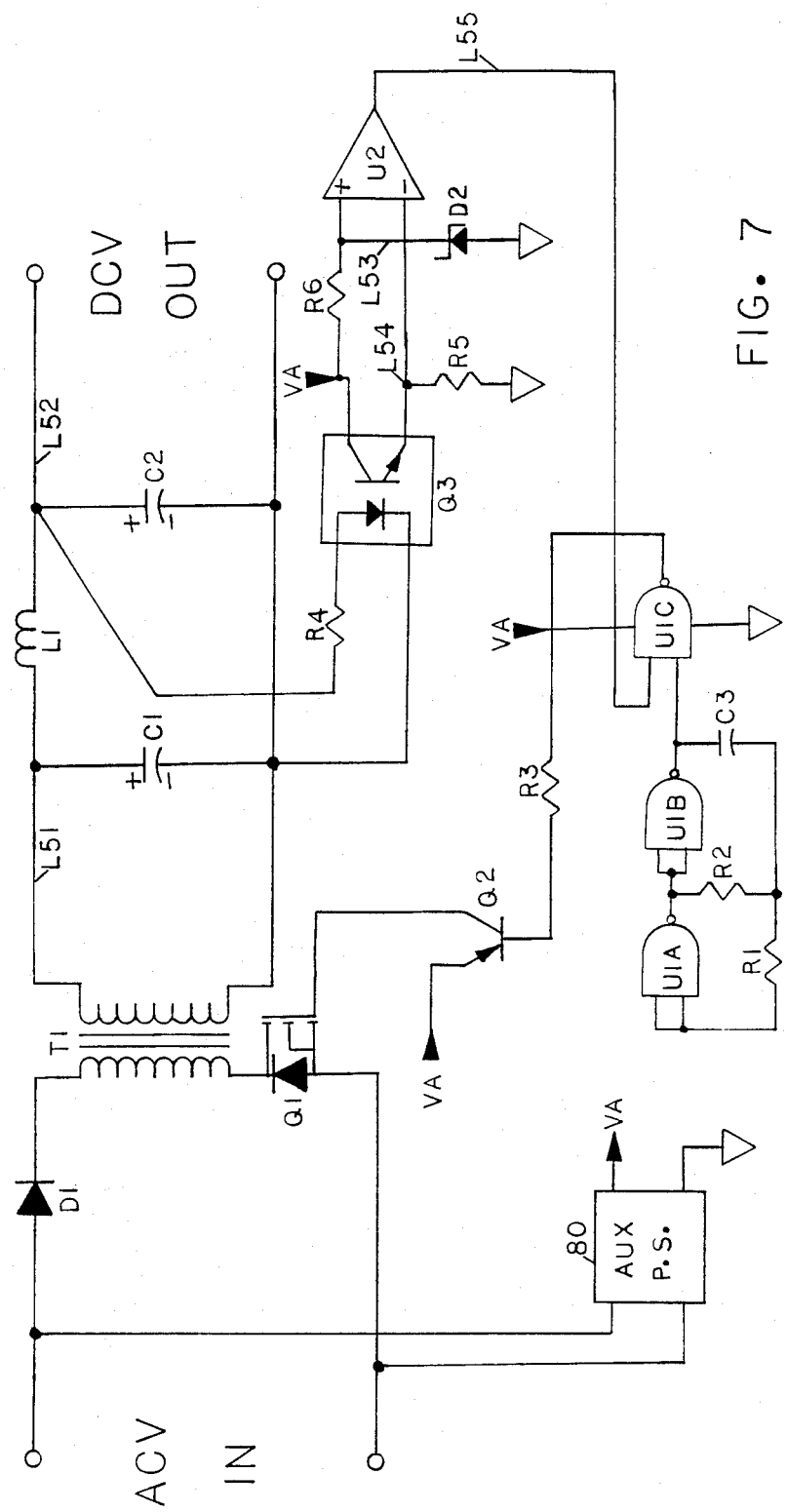
FIG. 7 is the schematic of the half-wave rectified solid state power supply. This includes both power circuit and control circuit components.

The half-wave rectified isolated SSPS is shown in FIG. 7. This requires a single MOSFET Q1 and a single reverse biasing diode D1 in the input switching circuit. Transformer T1 isolates the input from the output. C1, C2 and L1 form the output filter circuit. Optoisolater Q3 senses the output voltage at L52, isolates it and generates a voltage at L54 with the help of resistors R4 and R5. The value of this voltage is equal to the reference voltage at L53 when the output at L52 is of the desired value. The comparator U2 generates a switching signal at its output L55. This is gated with the clock frequency generated by U1A and U1B circuit. The output of the gate U1C is used to generate a large drive signal with transistor Q2. This large drive signal is fed to the gate of the MOSFET Q1. The auxiliary power supply, shown at block 80, may be 4-terminal isolated power supply of 3-terminal non-isolated power supply with common ground in this case.

If at any time, the voltage at output L52 is less than the desired output, then the signal at L54 will be less than the reference signal at L53. This turns the output of U2 at L55 to high level. This allows the gate U1C to pass clock at its output. As a result, the MOSFET Q1 turns on and off at very high frequency during positive phase of the sine wave. In the same way, when the output at L52 is greater than the desired DC outout, then Q1 must turn off and actually, the signal at L54 being greater than that at L53, the output of U2 at L55 goes low. This stops the clock and turns off the MOSFET Q1.

The waveshapes of FIG. 6 will be valid in this case except that the negative pulse will not exist. The lapse of the negative pulse will require greater amount of filtering in this case as compared to the full-wave rectified isolaated SSPS. The clock generator using operational amplifier, comparator, logical inverter of cyrstal may be used here also. This circuit requires less amount of solid state circuit, but greater amount of the filtering circuit. This circuit may be more useful in developing power supplies of the low to medium power rating.

MOSFET as a Pulsed-Power Circuit

The pulsed-power mechanism of the MOSFET is explained here. This is useful in reducing the size of the SSPS by reducing the size of the filtering by large pulsed-power capability. This may be better explained with some examples. A MOSFET of 200 V drain to source voltage delivering 30 Amperes of average drain current is readily available. This constitutes a power transfer of 6000 watts, which realistically, may drop down to 1000 watts due to heat dissipation of the device. Considering the volume of a T03 package of a MOSFET to be about 0.3 cubic inch, the power density of such a device may be regared as 3000 watts per cubic inch. The power density of high frequency transformer and filtering network are well under this value. Thus if by extending the capability of MOSFETs by operating them at pulsed-drain current, smaller on time of such MOSFETs be achieved, then the resulting higher switching frequency shall reduce further the size of the filtering and magnetic circuits.

Now consider a MOSFET switching a 12 V DC source to a capacitor through a small series inductor. The MOSFET is turned on and as the capacitor charges to 5 V, it is turned off. If the 12 V DC source be replaced by a 48 V DC power, the capacitor shall now be charged to 5 V in one-fourth the previous on-time and the new initial charging current shall increase to four times the previous initial charging current approximately.

The effect of increasing the DC source voltage and thereby decreasing the charging time shall be to increase the switching frequency, which will decrease the size of the magnetic circuits. The effect of this shall be a reduction in size of the magnetic and filtering circuits by pulsed-power technique. This is equivalent to exchanging the low density magnetic/filter components with very high density MOSFET devices. The DC source voltage feeding the output circuit can be easily increased by increasing the secondary to primary turns ratio of the isolating transformer, or in case of the non-isolated SSPS, by not stepping down the high input AC or DC voltage. This shall increase the power dissipation in the MOSFET, which shall be reduced by selecting MOSFETs of lower on-state resistance and by reducing the duty cycle of operation. This shall increase considerably the size of the MOSFET, but the overall effect shall be the net reduction in size of the SSPS.

Description of the Non-Isolated SSPS

The non-isolated full-wave rectified SSPS does not require the isolating transformer. Thus by removing the h-f transformer in FIG. 1 and transformer T1 in FIG. 3, the non-isolated full-wave rectified solid state power supply shall result. The supply is non-isolated because during a portion of the sinusoidal cycle one of the input leads gets connected through diodes to an output lead. This connection will not be damaging to the load, if it is a single load not interconnected to any other power supply and load. The removal of the transformer futher reduces the size of the power supply and thus non-isolated SSPS will be of maximum power density. The control circuit and the timing diagram of the non-isolated full-wave rectified SSPS will be the same as that of the similar isolated SSPS.

By removing the transormer T1 of FIG. 7 results into a non-isolated half-wave rectified SSPS. Here also the power density will increase and the control circuit will remain unchanged. This power supply may have application in several standalone power packs like power-plugs and small power packs for small electronic products.

I claim:

1. An isolated full wave rectified power supply device for generating DC power from an AC power source comprising:
   auxiliary power supply means to generate an auxiliary DC power source which provides an input sense signal and the input to a reference voltage means to generate a reference voltage signal;
   switching circuit means in circuit with the AC power source for switching on and off the AC power source and providing and output voltage;
   high frequency transformer means receiving the output voltage from the switching circuit means and providing an isolated transformer output voltage;
   output filter means for filtering the high frequency transformer output voltage to a DC output voltage;
   signal isolation means receiving the DC output voltage and generating an isolated output sense signal; and
   control circuit means utilizing the input sense signal and the output sense signal and modulating them with the reference voltage signal to generate positive pulse and negative pulse control signals to control the switching circuit means.

2. The device according to claim 1 wherein the switching circuit means is a controlled bridge rectifier including a diode in two limbs and a diode and a MOSFET device in series in the remaining two limbs, the circuit connected in such a way as to generate a full-wave rectified switched output when the MOSFETs are turned on and off.

3. The device according to claim 2 wherein the control circuit means further includes:
   positive pulse detector means which, upon receiving the input sense signal, generates an output pulse in phase with the positive AC signal;
   negative pulse detector means which, upon receiving the input sense signal or the output pulse of the positive pulse detector means, generate an output pulse in phase with the negative AC signal;
   high frequency clock means for generating a high frequency clocking signal;
   voltage regulation gating means in which the output of the high frequency clock means, when ANDed with the output sense signal, produces an output sensed gated clock;
   positive pulse driver means in which the output of the positive pulse detector means, when ANDed with the output sensed gated clock, creates a positive pulse control signal; and
   negative pulse driver means in which the output of the negative pulse detector means, when ANDed with the output sensed gated clock, creates a negative pulse control signal.

4. The device according to claim 3 wherein the positive pulse detector means further includes a comparator circuit, the negative input of which is maintained at a potential sllightly over ground potential and the positive input of which is connected to the input sense signal.

5. The device according to claim 3 wherein the negative pulse detector means further includes a comparator circuit, the negative input of which is connected to the output of the positive pulse detector means and the positive input of which is maintained at a positive potential.

6. The device according to claim 3 wherein the voltage regulation gating means further includes a comparator circuit, the negative input of which is connected to the output sense signal and the positive input of which is maintained at the reference voltage signal.

7. An isolated half wave rectified power supply device for generating DC power from an AC power source comprising:
   auxiliary power supply means to generate an auxiliary DC power source which provides the input to a reference voltage means to generate a reference voltage signal;

switching circuit means in circuit with the AC power source for switching on and off the AC power source and providing an output voltage;

high frequency transformer means receiving the output voltage from the switching circuit means and providing an isolated transformer output voltage;

output filter means for filtering the high frequency transformer output voltage to a DC output voltage;

signal isolation means receiving the DC output voltage and generating an isolated output sense signal; and control circuit means utilizing the output sense signal and the reference voltage signal to generate a gated clock control signal to control the switching circuit means.

8. The device according to claim 7 wherein the switching circuit means further includes a MOSFET in series with a diode, both connected in such a way in series with the high frequency transformer means that a half-wave rectified voltage is generated across the transformer means when the MOSFET is turned on.

9. The device according to claim 8 wherein the control circuit means further includes:

high frequency clock means providing a high frequency clock signal;

feedback comparator means in which the output sense signal and reference voltage signal produce a regulated gating signal; and a NAND gated controlled means in which one input is the high frequency clock signal and the other input the regulated gating signal, the output of the NAND gated controlled means providing drive to turn on and off repeatedly the MOSFET of the switching circuit means.

10. The device according to claim 9 wherein the feedback comparator means comprises a comparator circuit, the negative input of which is connected to the output sense signal and the positive input is maintained at the reference voltage signal.

* * * * *